(12) United States Patent
Yu et al.

(10) Patent No.: US 11,342,757 B2
(45) Date of Patent: May 24, 2022

(54) ISLANDING DETECTION METHOD AND APPARATUS, AND COMPUTER-READABLE STORAGE MEDIUM

(71) Applicant: HUAWEI DIGITAL POWER TECHNOLOGIES CO., LTD., Shenzhen (CN)

(72) Inventors: Xinyu Yu, Shanghai (CN); Kai Xin, Shanghai (CN); Junjie Li, Shanghai (CN)

(73) Assignee: Huawei Digital Power Technologies Co., Ltd, Shenzhen (CN)

( * ) Notice: Subject to any disclaimer, the term of this patent is extended or adjusted under 35 U.S.C. 154(b) by 0 days.

(21) Appl. No.: 17/479,820

(22) Filed: Sep. 20, 2021

(65) Prior Publication Data
US 2022/0006298 A1 Jan. 6, 2022

Related U.S. Application Data

(63) Continuation of application No. PCT/CN2020/086491, filed on Apr. 23, 2020.

(30) Foreign Application Priority Data

Jul. 30, 2019 (CN) .......................... 201910692755.5

(51) Int. Cl.
*H02J 3/38* (2006.01)
*H02J 3/00* (2006.01)
*H02J 3/01* (2006.01)
(52) U.S. Cl.
CPC .............. *H02J 3/388* (2020.01); *H02J 3/007* (2020.01); *H02J 3/01* (2013.01)
(58) Field of Classification Search
CPC ... H02J 3/388; H02J 3/007; H02J 3/01; G01R 31/088
See application file for complete search history.

(56) References Cited

U.S. PATENT DOCUMENTS

| 5,493,485 A | 2/1996 | Okado | |
| 2018/0179966 A1* | 6/2018 | Hosoya | ................. F02B 37/183 |

FOREIGN PATENT DOCUMENTS

| CN | 1086639 A | * | 5/1994 | ............. H02M 7/48 |
| CN | 102437587 A | | 5/2012 | |

(Continued)

*Primary Examiner* — Daniel Cavallari
(74) *Attorney, Agent, or Firm* — Leydig, Voit & Mayer, Ltd.

(57) ABSTRACT

An islanding detection method and apparatus, and a computer-readable storage medium. The detection method includes: determining a harmonic amplitude growth rate and a frequency growth rate of alternating current electricity output by an alternating current port of a grid-tied inverter; determining an islanding disturbance coefficient corresponding to the harmonic amplitude growth rate, where the harmonic amplitude growth rate and the islanding disturbance coefficient are in a monotonically increasing relationship; determining an islanding injection amount based on the frequency growth rate and the islanding disturbance coefficient corresponding to the harmonic amplitude growth rate; controlling, based on the islanding injection amount, the grid-tied inverter to output a reactive power or a reactive current over the alternating current port; and performing islanding detection based on a frequency of the alternating current electricity output by the alternating current port. With this detection method, whether islanding occurs can be accurately detected. When islanding does not occur, disturbance to a power grid is reduced, and grid connection stability is improved. When islanding occurs, it can be quickly detected, and a detection time is relatively short.

17 Claims, 6 Drawing Sheets

(56) References Cited

FOREIGN PATENT DOCUMENTS

| | | | |
|---|---|---|---|
| CN | 102590713 A | | 7/2012 |
| CN | 103645404 A | | 3/2014 |
| CN | 103675562 A | | 3/2014 |
| CN | 105467252 A | | 4/2016 |
| CN | 105738730 A | | 7/2016 |
| CN | 106877392 A | | 6/2017 |
| CN | 107422196 A | * | 12/2017 |
| CN | 107422196 A | | 12/2017 |
| CN | 107703378 A | | 2/2018 |
| CN | 107765108 A | | 3/2018 |
| CN | 108152672 A | | 6/2018 |
| CN | 108233423 A | | 6/2018 |
| CN | 110488148 A | | 11/2019 |
| EP | 3493353 A1 | | 6/2019 |
| JP | 2011015565 A | | 1/2011 |
| JP | 2016010314 A | | 1/2016 |
| JP | 2017163768 A | | 9/2017 |
| WO | 2014067187 A1 | | 5/2014 |

* cited by examiner

ISLANDING DETECTION METHOD AND APPARATUS, AND COMPUTER-READABLE STORAGE MEDIUM

CROSS-REFERENCE TO RELATED APPLICATIONS

This application is a continuation of International Application No. PCT/CN2020/086491, filed on Apr. 23, 2020, which claims priority to Chinese Patent Application No. 201910692755.5, filed on Jul. 30, 2019. The disclosures of the aforementioned applications are hereby incorporated by reference in their entireties.

TECHNICAL FIELD

This application relates to the field of electric power technologies, and in particular, to an islanding detection method and apparatus, and a computer-readable storage medium.

BACKGROUND

A grid-tied inverter is an important part of a new-energy power generating system. It converts direct current electricity generated by a power generating apparatus such as a photovoltaic battery or a wind turbine in a new-energy power generating system into alternating current electricity and then feeds the alternating current electricity to a power grid. Islanding is prone to occur during operation of the new-energy power generating system. Islanding refers to an electrical phenomenon in which the new-energy power generating system is disconnected from the power grid when the power grid is cut off due to a fault, a maintenance issue, or the like, but the grid-tied inverter in the new-energy power generating system continues to supply power to a local load.

Islanding easily causes damage to devices in the new-energy power generating system and even endangers personal safety. For example, when the power grid is restored to normal, a voltage phase of the power grid is different from a voltage phase of the new-energy power generating system that encounters islanding, and consequently, a device may be damaged due to overvoltage or overcurrent. For another example, when a maintenance person fails to learn in time that islanding has occurred in the new-energy power generating system, the maintenance person may mistakenly believe that the new-energy power generating system is no longer energized, and an electric shock accident may be caused. For this reason, islanding needs to be detected quickly, so that protective measures can be taken in time.

In the conventional technology, in islanding detection, status parameters such as a voltage amplitude, a frequency, and a harmonic of alternating current electricity output by an alternating current port of the grid-tied inverter are usually detected. When jumps of these status parameters are detected, it is determined that islanding occurs. However, a fluctuation of the power grid may also lead to short-term jumps of the status parameters such as the voltage amplitude, the frequency, and the harmonic of the alternating current electricity output by the alternating current port of the grid-tied inverter. Therefore, this manner is prone to false detection.

SUMMARY

This application provides an islanding detection method and apparatus, and a computer readable storage medium, to resolve a problem that in a related technology islanding detection has relatively low accuracy. The technical solutions are as follows:

According to a first aspect, an islanding detection method is provided. The method includes: determining a harmonic amplitude growth rate and a frequency growth rate of alternating current electricity output by an alternating current port of a grid-tied inverter; determining an islanding disturbance coefficient corresponding to the harmonic amplitude growth rate, where the harmonic amplitude growth rate and the islanding disturbance coefficient are in a monotonically increasing relationship; determining an islanding injection amount based on the frequency growth rate and the islanding disturbance coefficient corresponding to the harmonic amplitude growth rate, where the islanding injection amount is a reactive power size or a reactive current size for performing reactive power disturbance; controlling, based on the islanding injection amount, the grid-tied inverter to output a reactive power or a reactive current over the alternating current port; and performing islanding detection based on a frequency of the alternating current electricity output by the alternating current port.

It should be noted that, a harmonic is a component that is greater than a fundamental frequency and that is obtained by performing Fourier series decomposition on a periodic non-sinusoidal alternating current component. A harmonic amplitude is a maximum absolute value that appears instantaneously in a harmonic in one cycle. The harmonic amplitude growth rate is a ratio of a harmonic amplitude growth in a period of time to a harmonic amplitude at a start time point of the period of time. A harmonic in the alternating current electricity output by the alternating current port may be a $k^{th}$ harmonic, and k is a harmonic order of the harmonic, namely, a ratio of a harmonic frequency to a fundamental frequency.

In addition, a frequency is a number of periodic changes that are completed within a unit time, and the frequency of the alternating current electricity may be a frequency of a voltage of the alternating current electricity or may be a frequency of a current of the alternating current electricity. The frequency growth rate is a ratio of a frequency growth in a period of time to a frequency at a start time point in the period of time.

Moreover, that the harmonic amplitude growth rate and the islanding disturbance coefficient are in a monotonically increasing relationship means that the islanding disturbance coefficient progressively increases or does not decrease as the harmonic amplitude growth rate increases, and the islanding disturbance coefficient shows an overall increasing trend (namely, a trend that is not always non-decreasing) as the harmonic amplitude growth rate increases. The islanding disturbance coefficient is used to determine a magnitude of reactive power disturbance that needs to be performed, and the islanding disturbance coefficient and the magnitude of the reactive power disturbance are in a positive correlation relationship.

Finally, the reactive power disturbance refers to disturbing the reactive power output by the alternating current port of the grid-tied inverter, so that the frequency of the alternating current electricity output by the alternating current port of the grid-tied inverter changes. The reactive power is an electric power required for establishing an alternating magnetic field and an induction flux. It is used for electric and magnetic fields in a circuit and used to establish and maintain a magnetic field in electric equipment. The reactive current is a current with a 90 degree phase difference from a voltage.

When islanding does not occur, the harmonic in the alternating current electricity output by the alternating current port does not abruptly change, that is, the harmonic amplitude growth rate of the alternating current electricity output by the alternating current port is relatively low In this case, the islanding disturbance coefficient is relatively low, and the grid-tied inverter is controlled to output a relatively small reactive power or reactive current over the alternating current port, to help reduce disturbance to a power grid and improve grid connection stability, thereby improving adaptability of the grid-tied inverter to a weak power grid. In addition, because islanding does not occur at this time, that is, the grid-tied inverter is connected to the power grid, the frequency of the alternating current electricity output by the alternating current port is not offset. Accordingly, it can be accurately detected that islanding does not occur.

After islanding occurs, the harmonic in the alternating current electricity output by the alternating current port changes abruptly, that is, the harmonic amplitude growth rate of the alternating current electricity output by the alternating current port increases. In this case, the islanding disturbance coefficient also increases, and the grid-tied inverter is controlled to output a relatively large reactive power or reactive current over the alternating current port. Because a size of the reactive power or the reactive current output by the alternating current port is also determined by the frequency growth rate of the alternating current electricity output by the alternating current port, under action of a frequency positive feedback feature unique to islanding, the frequency of the alternating current electricity output by the alternating current port can be quickly offset. Accordingly, it can be accurately detected that islanding occurs.

In addition, when islanding does not occur, even if the harmonic in the alternating current electricity output by the alternating current port changes abruptly due to a fluctuation of the power grid, the grid-tied inverter does not directly perform islanding protection. Instead, the grid-tied inverter is controlled to first output an increasing reactive power or reactive current over the alternating current port, and subsequently perform islanding detection based on the frequency of the alternating current electricity output by the alternating current port, to determine whether to perform islanding protection. When islanding does not occur, that is, when the grid-tied inverter is connected to the power grid, even if the reactive power or the reactive current output by the alternating current port is relatively large, the frequency of the alternating current electricity output by the alternating current port is not offset. Accordingly, it can be accurately detected that islanding does not occur. This can prevent the grid-tied inverter from falsely performing islanding protection due to the fluctuation of the power grid.

It can be learned from the foregoing description that, in this embodiment of this application, in one aspect, disturbance to the power grid caused by an islanding detection operation can be reduced when islanding does not occur, that is, when the grid-tied inverter works normally, to improve grid connection stability. In addition, islanding occurrence can be quickly detected when islanding occurs, to reduce a detection time and improve reliability and security, thereby quickly implementing islanding protection.

In a possible implementation, the harmonic amplitude growth rate is a harmonic voltage amplitude growth rate, and the determining a harmonic amplitude growth rate of alternating current electricity output by an alternating current port of a grid-tied inverter includes: determining, based on a voltage of the alternating current electricity output by the alternating current port, a harmonic voltage amplitude of the alternating current electricity output by the alternating current port; and determining, based on the harmonic voltage amplitude, the harmonic voltage amplitude growth rate of the alternating current electricity output by the alternating current port.

In another possible implementation, the harmonic amplitude growth rate is a harmonic impedance amplitude growth rate, and the determining a harmonic amplitude growth rate of alternating current electricity output by an alternating current port of a grid-tied inverter includes: determining, based on a voltage of the alternating current electricity output by the alternating current port, a harmonic voltage amplitude of the alternating current electricity output by the alternating current port; determining, based on a current of the alternating current electricity output by the alternating current port, a harmonic current amplitude of the alternating current electricity output by the alternating current port; dividing the harmonic voltage amplitude by the harmonic current amplitude to obtain a harmonic impedance amplitude of the alternating current electricity output by the alternating current port; and determining, based on the harmonic impedance amplitude, the harmonic impedance amplitude growth rate of the alternating current electricity output by the alternating current port.

It should be noted that, the harmonic amplitude growth rate of the alternating current electricity output by the alternating current port of the grid-tied inverter may be the harmonic voltage amplitude growth rate, the harmonic impedance amplitude growth rate, or the like. The harmonic voltage amplitude is a maximum absolute value that appears in a harmonic voltage in one cycle. The harmonic impedance amplitude is a maximum absolute value that appears in harmonic impedance in one cycle. The harmonic current amplitude is a maximum absolute value that appears in a harmonic current in one cycle.

The determining an islanding disturbance coefficient corresponding to the harmonic amplitude growth rate includes: when the harmonic amplitude growth rate and the islanding disturbance coefficient are in a strictly monotonically increasing relationship, obtaining the corresponding islanding disturbance coefficient from a stored correspondence between a harmonic amplitude growth rate and an islanding disturbance coefficient based on the harmonic amplitude growth rate; or when the harmonic amplitude growth rate and the islanding disturbance coefficient are in a non-strictly monotonically increasing relationship, obtaining the corresponding islanding disturbance coefficient from a stored correspondence between a harmonic amplitude growth rate range and an islanding disturbance coefficient based on the harmonic amplitude growth rate; or obtaining the corresponding islanding disturbance coefficient based on the harmonic amplitude growth rate by using a reference function.

It should be noted that, that the harmonic amplitude growth rate and the islanding disturbance coefficient are in a strictly monotonically increasing relationship means: the islanding disturbance coefficient progressively increases as the harmonic amplitude growth rate increases. That the harmonic amplitude growth rate and the islanding disturbance coefficient are in a non-strictly monotonically increasing relationship means: the islanding disturbance coefficient progressively increases as the harmonic amplitude growth rate increases in one harmonic amplitude growth rate range, but the islanding disturbance coefficient remains unchanged as the harmonic amplitude growth rate increases in another harmonic amplitude growth rate range.

In this embodiment of this application, the islanding disturbance coefficient is used to determine the magnitude of the reactive power disturbance that needs to be performed subsequently. The corresponding islanding disturbance coefficient is determined based on the harmonic amplitude growth rate of the alternating current electricity output by the alternating current port, the harmonic amplitude growth rate is correlated with a possibility of islanding occurrence, and further the harmonic amplitude growth rate and the islanding disturbance coefficient are in the monotonically increasing relationship. Therefore, when the possibility of islanding occurrence is relatively low, the harmonic amplitude growth rate is relatively low, and accordingly the determined islanding disturbance coefficient is relatively low; and when the probability of islanding occurrence is relatively high, the harmonic amplitude growth rate is relatively high, and accordingly the determined islanding disturbance coefficient is relatively high.

In a possible implementation, the islanding injection amount is the reactive power size for performing reactive power disturbance, and the determining an islanding injection amount based on the frequency growth rate and the islanding disturbance coefficient corresponding to the harmonic amplitude growth rate includes: determining an active power output by the alternating current port; and multiplying the islanding disturbance coefficient corresponding to the harmonic amplitude growth rate, the frequency growth rate, and the active power output by the alternating current port, to obtain the islanding injection amount.

In another possible implementation, the islanding injection amount is the reactive current size for performing reactive power disturbance, and the determining an islanding injection amount based on the frequency growth rate and the islanding disturbance coefficient corresponding to the harmonic amplitude growth rate includes: determining an active current output by the alternating current port; and multiplying the islanding disturbance coefficient corresponding to the harmonic amplitude growth rate, the frequency growth rate, and the active current output by the alternating current port, to obtain the islanding injection amount.

It should be noted that, the active power is an average value of instantaneous powers output by a power supply in one cycle, and is an electric power required for maintaining normal operation of the electric equipment, namely, an electric power for converting electric energy into another form of energy (mechanical energy, photon energy, or thermal energy). The active current is a current that has a same phase as a voltage.

In this embodiment of this application, the frequency growth rate and the islanding disturbance coefficient each are in a positive correlation relationship with the islanding injection amount, that is, a smaller value of either of the frequency growth rate and the islanding disturbance coefficient indicates a smaller islanding injection amount and smaller subsequent reactive power disturbance; and a larger value of either of the frequency growth rate and the islanding disturbance coefficient indicates a larger islanding injection amount and larger subsequent reactive power disturbance.

The performing islanding detection based on a frequency of the alternating current electricity output by the alternating current port includes: when the frequency of the alternating current electricity output by the alternating current port is continuously greater than a first reference frequency or continuously less than a second reference frequency within reference duration, determining that islanding occurs.

In this embodiment of this application, when the frequency of the alternating current electricity output by the alternating current port is continuously greater than the first reference frequency or continuously less than the second reference frequency within the reference duration, it indicates that the frequency of the alternating current electricity output by the alternating current port is continuously relatively small or large within a period of time. Therefore, it can be determined that islanding has occurred.

Further, after the performing islanding detection based on a frequency of the alternating current port, the method further includes: when it is determined that islanding occurs, stopping outputting the alternating current electricity over the alternating current port. In this way, the grid-tied inverter does not continue to supply power to a load, thereby implementing islanding protection.

According to a second aspect, an islanding detection apparatus is provided, and the islanding detection apparatus has a function of implementing behavior in the islanding detection method in the first aspect. The islanding detection apparatus includes at least one module, and the at least one module is configured to implement the islanding detection method provided in the first aspect.

According to a third aspect, an islanding detection apparatus is provided. A structure of the islanding detection apparatus includes a processor and a memory. The memory is configured to store a program that supports the islanding detection apparatus in executing the islanding detection method provided in the first aspect; and store data used to implement the islanding detection method according to the first aspect. The processor is configured to execute the program stored in the memory. The islanding detection apparatus may further include a communications bus, and the communications bus is configured to establish a connection between the processor and the memory.

According to a fourth aspect, a computer-readable storage medium is provided. The computer-readable storage medium stores instructions, and when the instructions are run on a computer, the computer executes the islanding detection method according to the first aspect.

According to a fifth aspect, a computer program product including instructions is provided. When the instructions are run on a computer, the computer is enabled to execute the islanding detection method according to the first aspect.

Technical effects obtained by the second aspect, the third aspect, the fourth aspect, and the fifth aspect are similar to those obtained by corresponding technical means in the first aspect, and details are not described herein again.

The technical solutions provided in this application may bring at least the following beneficial effects:

The harmonic amplitude growth rate and the frequency growth rate of the alternating current electricity output by the alternating current port of the grid-tied inverter are determined. Then, the islanding disturbance coefficient corresponding to the harmonic amplitude growth rate of the alternating current electricity output by the alternating current port is determined, and the harmonic amplitude growth rate and the islanding disturbance coefficient are in the monotonically increasing relationship. The islanding injection amount is determined based on the frequency growth rate of the alternating current electricity output by the alternating current port and the islanding disturbance coefficient corresponding to the harmonic amplitude growth rate of the alternating current electricity output by the alternating current port. The grid-tied inverter is controlled based on the islanding injection amount to output the reactive power or the reactive current over the alternating current port. Finally, the islanding detection is performed based on the frequency of the alternating current electricity output by the alternating current port. In this way, whether islanding occurs can be accurately detected. In addition, when islanding does not occur, not only the disturbance to the power grid can be reduced to improve the grid connection stability, but also false detection caused by a fluctuation of the power grid can be avoided. When islanding occurs, it can be quickly detected, and a detection time is relatively short.

DESCRIPTION OF EMBODIMENTS

To make objectives, technical solutions, and advantages of this application clearer, the following further describes implementation of this application in detail with reference to the accompanying drawings.

A system architecture of the embodiments of this application is first described before the embodiments of this application are explained in detail.

Figure 1:
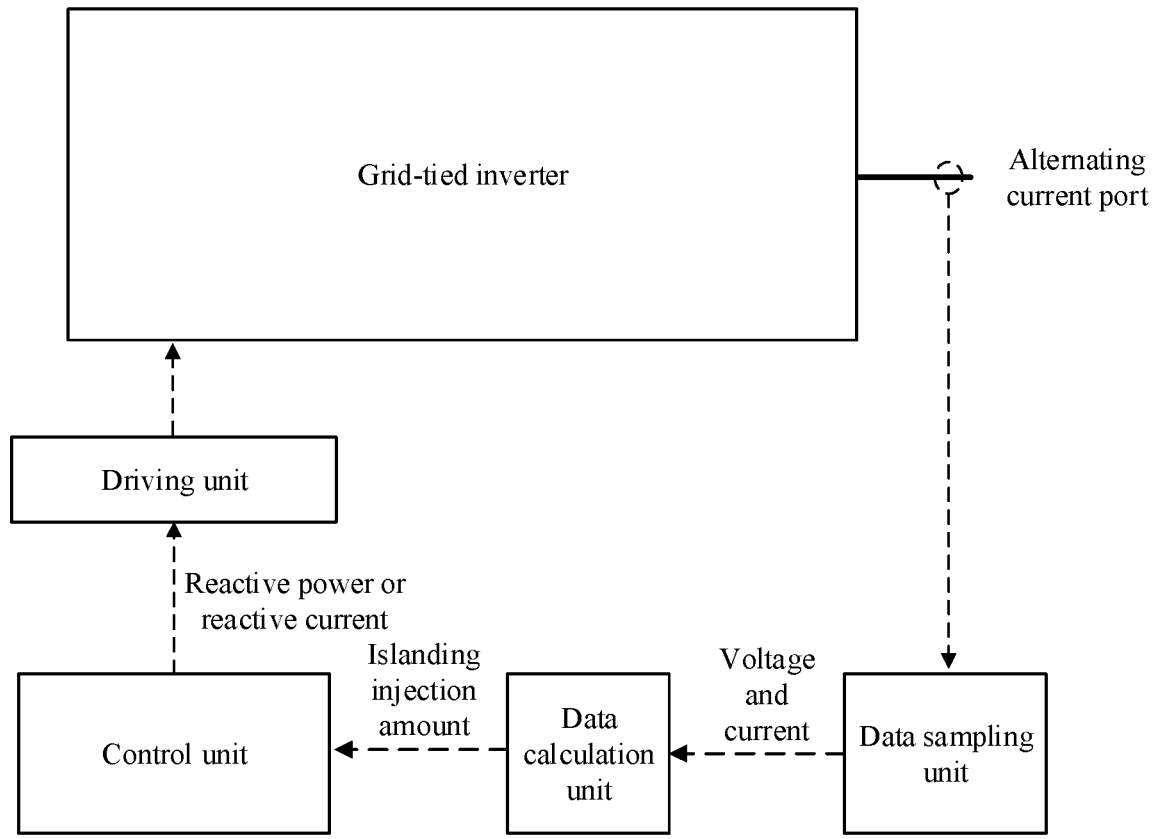
FIG. 1 is a schematic structural diagram of a grid-tied inverter control system according to an embodiment of this application.

FIG. 1 is a schematic structural diagram of a grid-tied inverter control system according to an embodiment of this application. As shown in FIG. 1, the grid-tied inverter control system includes a grid-tied inverter, a data sampling unit, a data calculation unit, a control unit, and a driving unit. The grid-tied inverter control system may be applied to a scenario in which a grid-tied inverter is used to supply power to a power grid, for example, may be applied to a large centralized power plant scenario, a small- and medium-sized distributed power plant scenario, or a residential new-energy power generating scenario.

The grid-tied inverter may convert direct current electricity generated by a power generating apparatus into alternating current electricity and then feed the alternating current electricity to the power grid. The data sampling unit may collect a voltage and a current of alternating current electricity output by an alternating current port of the grid-tied inverter. The data calculation unit may calculate a frequency growth rate of the alternating current electricity output by the alternating current port, a harmonic amplitude growth rate of the alternating current electricity output by the alternating current port, an islanding disturbance coefficient, and an islanding injection amount. The control unit may control the grid-tied inverter to output a reactive power or a reactive current over the alternating current port. The driving unit may perform islanding protection when islanding occurs.

Figure 2:
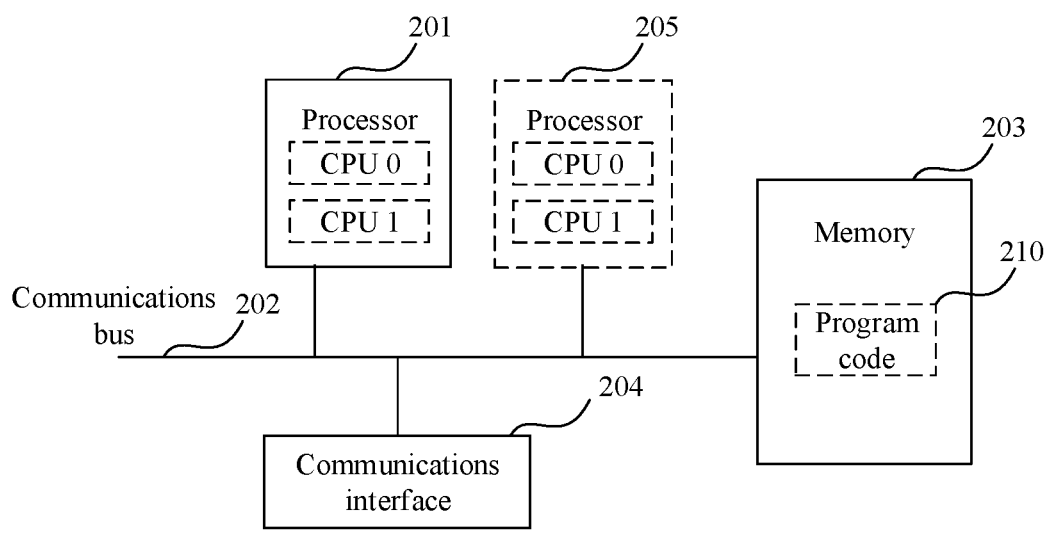
FIG. 2 is a schematic structural diagram of a computer device according to an embodiment of this application.

FIG. 2 is a schematic structural diagram of a computer device according to an embodiment of this application. The grid-tied inverter control system shown in FIG. 1 may be implemented by using the computer device shown in FIG. 2. Refer to FIG. 2 The computer device includes at least one processor 201, a communications bus 202, a memory 203, and at least one communications interface 204.

The processor 201 may be a general-purpose central processing unit (CPU), a microprocessor, or an application-specific integrated circuit (ASIC), or may be one or more integrated circuits configured to control program execution in the solutions of this application.

The communication bus 202 may include a path for transferring information between the foregoing components.

The memory 203 may be a read-only memory (ROM) or another type of static storage device that can store static information and instructions, or may be a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, and the like), or a disk storage medium or another magnetic storage device, or any other medium capable of carrying or storing desired program code in a form of instructions or a data structure and capable of being accessed by a computer. This application not limited thereto. The memory 203 may exist independently, and is connected to the processor 201 by using the communications bus 202. Alternatively, the memory 203 may be integrated with the processor 201.

The communications interface 204 is any apparatus such as a transceiver, and is configured to communicate with another device or a communications network, such as an Ethernet, a radio access network (RAN), or a wireless local area network (WLAN).

During specific implementation, in an embodiment, the processor 201 may include one or more CPUs, for example, a CPU 0 and a CPU 1 shown in FIG. 2.

During specific implementation, in an embodiment, the computer device may include a plurality of processors, for example, a processor 201 and a processor 205 shown in FIG. 2. Each of these processors may be a single-core processor (single-CPU), or may be a multi-core processor (multi-CPU). The processor herein may refer to one or more devices, circuits, and/or processing cores configured to process data (such as computer program instructions).

The foregoing computer device may be a general-purpose computer device or a dedicated computer device. During specific implementation, the computer device may be a desktop computer, a portable computer, a network server, a palmtop computer (Personal Digital Assistant, PDA), a mobile phone, a tablet, a wireless terminal device, a communications device, or an embedded device. A type of the computer device is not limited in the embodiments of this application.

The memory 203 is configured to store program code 210 for executing the solutions of this application. The processor 201 is configured to execute the program code 210 stored in the memory 203. By using the processor 201 and the program code 210 in the memory 203, the computer device can implement an islanding detection method provided in an embodiment in FIG. 3 below.

Figure 3:
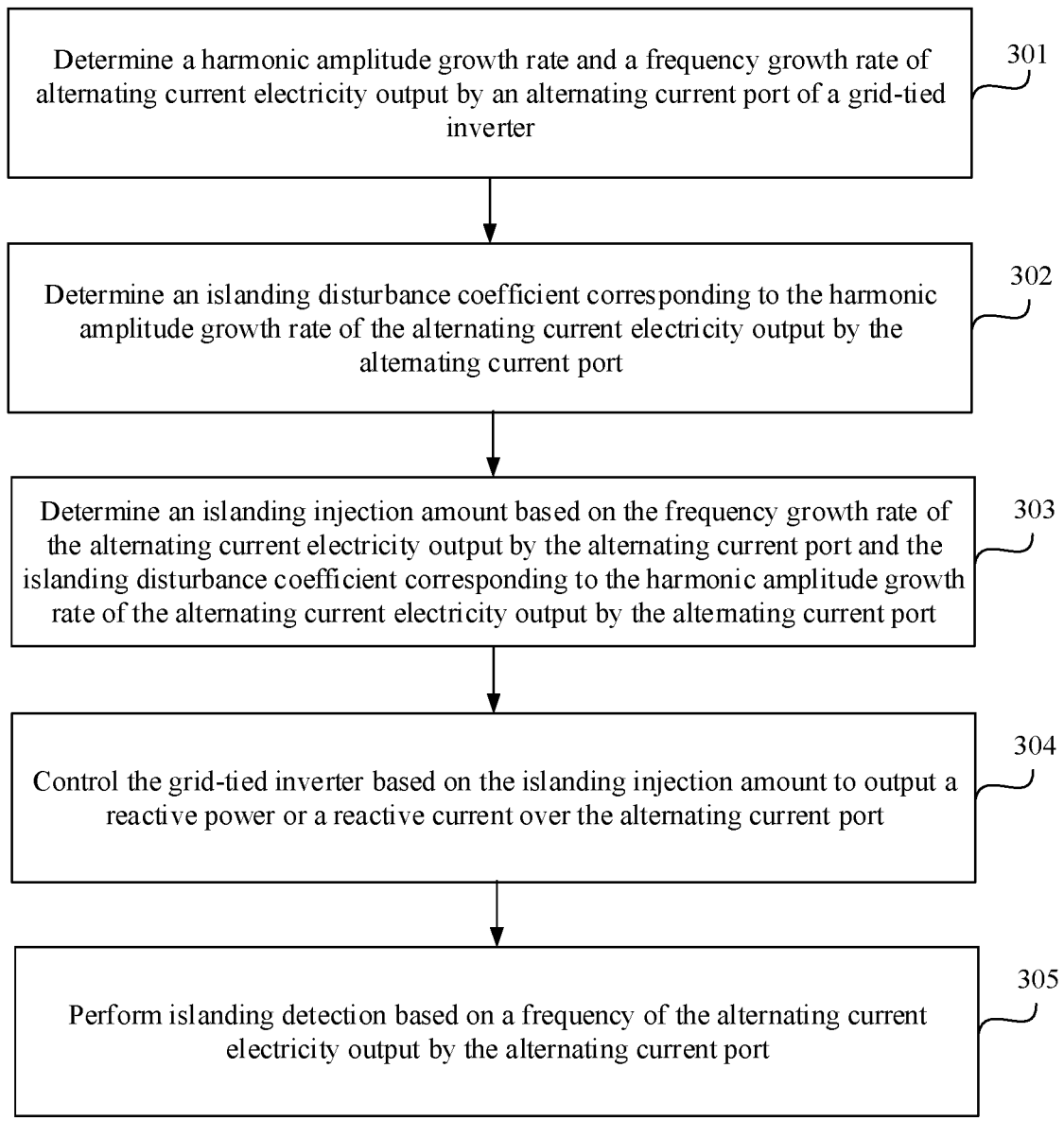
FIG. 3 is a flowchart of an islanding detection method according to an embodiment of this application.

FIG. 3 is a flowchart of an islanding detection method according to an embodiment of this application. Refer to FIG. 3. The method includes the following steps.

Step 301: Determine a harmonic amplitude growth rate and a frequency growth rate of alternating current electricity output by an alternating current port of a grid-tied inverter.

It should be noted that, the grid-tied inverter is an important part of a new-energy power generating system. The grid-tied inverter converts direct current electricity generated by a power generating apparatus such as a photovoltaic battery or a wind turbine in the new-energy power generating system into alternating current electricity and then feeds the alternating current electricity to a power grid. The alternating current port of the grid-tied inverter is configured to transmit the alternating current electricity to the power grid.

In addition, a harmonic is a component that is greater than a fundamental frequency and that is obtained by performing Fourier series decomposition on a periodic non-sinusoidal alternating current component. A harmonic amplitude is a maximum absolute value that appears instantaneously in a harmonic in one cycle. The harmonic amplitude growth rate is a ratio of a harmonic amplitude growth in a period of time to a harmonic amplitude at a start time point of the period of time. The harmonic amplitude growth rate of the alternating current electricity output by the alternating current port of the grid-tied inverter may be a harmonic voltage amplitude growth rate, a harmonic impedance amplitude growth rate, or the like. A harmonic voltage amplitude is a maximum absolute value that appears in a harmonic voltage in one cycle. A harmonic impedance amplitude is a maximum absolute value that appears in harmonic impedance in one cycle. A harmonic in the alternating current electricity output by the alternating current port may be a $k^{th}$ harmonic, and k is a harmonic order of the harmonic, namely, a ratio of a harmonic frequency to a fundamental frequency. For example, k may be preset, and may be greater than 1 and less than 40. Certainly, k may alternatively be another value greater than 1. This embodiment of this application sets no limitation thereto.

Moreover, a frequency is a number of periodic changes that are completed within a unit time, and a frequency of the alternating current electricity may be a frequency of a voltage of the alternating current electricity or may be a frequency of a current of the alternating current electricity. The frequency growth rate is a ratio of a frequency growth in a period of time to a frequency at a start time point in the period of time.

When the grid-tied inverter is connected to the power grid, the harmonic output by the alternating current port of the grid-tied inverter flows into the power grid. Because impedance of the power grid is small, a total harmonic distortion rate of the alternating current port of the grid-tied inverter is usually relatively low. When the power grid is cut off, if islanding occurs, the alternating current port of the grid-tied inverter generates a large harmonic because impedance of a local load is usually much greater than the impedance of the power grid. As a result, occurrence of islanding leads to an abrupt change in the harmonic of the alternating current port of the grid-tied inverter. Therefore, in this embodiment of this application, the harmonic amplitude growth rate of the alternating current electricity output by the alternating current port of the grid-tied inverter may be first determined. Accordingly, a magnitude of reactive power disturbance that needs to be performed subsequently is determined.

To determine the frequency growth rate of the alternating current electricity output by the alternating current port of the grid-tied inverter, the frequency of the alternating current electricity output by the alternating current port may be detected in real time, and the frequency growth rate of the alternating current electricity output by the alternating current port may be determined based on the detected frequency.

For example, the frequency growth rate of the alternating current electricity output by the alternating current port may be determined by using a formula $\Delta f(t_n)=(f(t_n)-f(t_{n-m}))/f(t_{n-m})$, where $\Delta f(t_n)$ is a frequency growth rate in duration m of the alternating current electricity output by the alternating current port, $f(t_n)$ is a frequency at a moment $t_n$ of the alternating current electricity output by the alternating current port, and $f(t_{n-m})$ is a frequency at a moment $t_{n-m}$ of the alternating current electricity output by the alternating current port.

It should be noted that, the frequency of the alternating current electricity output by the alternating current port may be the frequency of the voltage of the alternating current electricity output by the alternating current port, or may be the frequency of the current of the alternating current electricity output by the alternating current port. For a manner of detecting the frequency of the alternating current electricity output by the alternating current port, refer to a related technology. Details are not described in this embodiment of this application. For example, the frequency of the alternating current electricity output by the alternating current port may be determined in a zero crossing detection manner.

An operation for determining the harmonic amplitude growth rate of the alternating current electricity output by the alternating current port of the grid-tied inverter may be implemented in two possible manners. In a possible implementation, when the harmonic amplitude growth rate is the harmonic voltage amplitude growth rate, a harmonic voltage amplitude of the alternating current electricity output by the alternating current port may be determined based on the voltage of the alternating current electricity output by the alternating current port; and the harmonic voltage amplitude growth rate of the alternating current electricity output by the alternating current port may be determined based on the harmonic voltage amplitude of the alternating current electricity output by the alternating current port. In another possible implementation, when the harmonic amplitude growth rate is the harmonic impedance amplitude growth rate, a harmonic voltage amplitude of the alternating current electricity output by the alternating current port may be determined based on the voltage of the alternating current electricity output by the alternating current port; a harmonic current amplitude of the alternating current electricity output by the alternating current port may be determined based on the current of the alternating current electricity output by the alternating current port; the harmonic voltage amplitude of the alternating current electricity output by the alternating current port is divided by the harmonic current amplitude of the alternating current electricity output by the alternating current port, to obtain a harmonic impedance amplitude of the alternating current electricity output by the alternating current port; and the harmonic impedance amplitude growth rate of the alternating current electricity output by the alternating current port is determined based on the harmonic impedance amplitude of the alternating current electricity output by the alternating current port.

It should be noted that, in this embodiment of this application, the voltage of the alternating current electricity output by the alternating current port may be detected in real time, and the harmonic voltage amplitude of the alternating current electricity output by the alternating current port may be determined based on the detected voltage. An operation for determining, based on the voltage of the alternating current electricity output by the alternating current port, the harmonic voltage amplitude of the alternating current electricity output by the alternating current port is similar to an operation for determining a harmonic voltage amplitude based on a voltage in a related technology. This is not described in detail in this embodiment of this application. For example, discrete Fourier transform may be performed on the voltage of the alternating current electricity output by the alternating current port, to obtain the harmonic voltage amplitude of the alternating current electricity output by the alternating current port.

In addition, in this embodiment of this application, the harmonic voltage amplitude of the alternating current electricity output by the alternating current port may be determined in real time, and the harmonic voltage amplitude growth rate of the alternating current electricity output by the alternating current port may be determined based on the determined harmonic voltage amplitude. For example, the harmonic voltage amplitude growth rate of the alternating current electricity output by the alternating current port may be determined by using a formula $\Delta U_{g,k}(t_n)=(U_{g,k}(t_n)-U_{g,k}(t_{n-m}))/U_{g,k}(t_{n-m})$, where $\Delta U_{g,k}(t_n)$ is a harmonic voltage amplitude growth rate in duration m of the alternating current electricity output by the alternating current port, $U_{g,k}(t_n)$ is a harmonic voltage amplitude at a moment $t_n$ of the alternating current electricity output by the alternating current port, and $U_{g,k}(t_{n-m})$ is a harmonic voltage amplitude at a moment $t_{n-m}$ of the alternating current electricity output by the alternating current port.

It should be noted that, in this embodiment of this application, the current of the alternating current electricity output by the alternating current port may be detected in real time, and the harmonic current amplitude of the alternating current electricity output by the alternating current port may be determined based on the detected current. A harmonic current amplitude is a maximum absolute value that appears in a harmonic current in one cycle. An operation for determining, based on the current of the alternating current electricity output by the alternating current port, the harmonic current amplitude of the alternating current electricity output by the alternating current port is similar to an operation for determining a harmonic current amplitude based on a current in a related technology. This is not described in detail in this embodiment of this application. For example, discrete Fourier transform may be performed on the current of the alternating current electricity output by the alternating current port, to obtain the harmonic current amplitude of the alternating current electricity output by the alternating current port.

In addition, in this embodiment of this application, the harmonic voltage amplitude and the harmonic current amplitude of the alternating current electricity output by the alternating current port may be first determined in real time; accordingly, the harmonic impedance amplitude of the alternating current electricity output by the alternating current port may be determined in real time; and then the harmonic impedance amplitude growth rate of the alternating current electricity output by the alternating current port may be determined based on the determined harmonic impedance amplitude. For example, the harmonic impedance amplitude growth rate of the alternating current electricity output by the alternating current port may be determined by using a formula $\Delta Z_{g,k}(t_n)=(Z_{g,k}(t_n)-Z_{g,k}(t_{n-m}))/Z_{g,k}(t_{n-m})$, where $\Delta Z_{g,k}(t_n)$ is a harmonic impedance amplitude growth rate in duration m of the alternating current electricity output by the alternating current port, $Z_{g,k}(t_n)$ is a harmonic impedance amplitude at a moment $t_n$ of the alternating current electricity output by the alternating current port, and $Z_{g,k}(t_{n-m})$ is a harmonic impedance amplitude at a moment $t_{n-m}$ of the alternating current electricity output by the alternating current port.

Step 302: Determine an islanding disturbance coefficient corresponding to the harmonic amplitude growth rate of the alternating current electricity output by the alternating current port.

It should be noted that, the harmonic amplitude growth rate and the islanding disturbance coefficient are in a monotonically increasing relationship. To be specific, the islanding disturbance coefficient progressively increases or does not decrease as the harmonic amplitude growth rate increases, and the islanding disturbance coefficient shows an overall increasing trend (namely, a trend that is not always non-decreasing) as the harmonic amplitude growth rate increases. The monotonically increasing relationship may include strictly monotonically increasing and non-strictly monotonically increasing. When the harmonic amplitude growth rate and the islanding disturbance coefficient are in the strictly monotonically increasing relationship, the islanding disturbance coefficient progressively increases as the harmonic amplitude growth rate increases; and when the harmonic amplitude growth rate and the islanding disturbance coefficient are in the non-strictly monotonically increasing relationship, the islanding disturbance coefficient progressively increases as the harmonic amplitude growth rate increases in one harmonic amplitude growth rate range, but the islanding disturbance coefficient remains unchanged as the harmonic amplitude growth rate increases in another harmonic amplitude growth rate range. The islanding disturbance coefficient is used to determine the magnitude of the reactive power disturbance that needs to be performed subsequently, and the islanding disturbance coefficient and the magnitude of the reactive power disturbance are in a positive correlation relationship.

In addition, in this embodiment of this application, the corresponding islanding disturbance coefficient is determined based on the harmonic amplitude growth rate of the alternating current electricity output by the alternating current port. The harmonic amplitude growth rate is correlated with a possibility of islanding occurrence, and further the harmonic amplitude growth rate and the islanding disturbance coefficient are in the monotonically increasing relationship. Therefore, when the possibility of islanding occurrence is low, the harmonic amplitude growth rate is low, and accordingly the determined islanding disturbance coefficient is low; and when the probability of islanding occurrence is high, the harmonic amplitude growth rate is high, and accordingly the determined islanding disturbance coefficient is high.

Specifically, the operation of step 302 is as follows: When the harmonic amplitude growth rate and the islanding disturbance coefficient are in the strictly monotonically increasing relationship, the corresponding islanding disturbance coefficient is obtained from a stored correspondence between a harmonic amplitude growth rate and an islanding disturbance coefficient based on the harmonic amplitude growth rate of the alternating current electricity output by the alternating current port; or when the harmonic amplitude growth rate and the islanding disturbance coefficient are in the non-strictly monotonically increasing relationship, the corresponding islanding disturbance coefficient is obtained from a stored correspondence between a harmonic amplitude growth rate range and an islanding disturbance coefficient based on the harmonic amplitude growth rate of the alternating current electricity output by the alternating current port; or the corresponding islanding disturbance coefficient is obtained based on the harmonic amplitude growth rate by using a reference function.

It should be noted that, the correspondence between a harmonic amplitude growth rate and an islanding disturbance coefficient may be preset, and in this correspondence, the harmonic amplitude growth rate and the islanding disturbance coefficient are in the monotonically increasing relationship.

For example, if the harmonic amplitude growth rate of the alternating current electricity output by the alternating current port is 100%, based on the harmonic amplitude growth rate 100% of the alternating current electricity output by the alternating current port, it can be learned from a correspondence between a harmonic amplitude growth rate and an islanding disturbance coefficient listed in the following Table 1 that, the corresponding islanding disturbance coefficient is 0.5.

TABLE 1

| Harmonic amplitude growth rate | Islanding disturbance coefficient |
|---|---|
| 100% | 0.5 |
| 200% | 1 |
| 400% | 4 |
| ... | ... |

It should be noted that, when the harmonic amplitude growth rate of the alternating current electricity output by the alternating current port is between two adjacent harmonic amplitude growth rates in Table 1 above, the island disturbance coefficient corresponding to the harmonic amplitude growth rate of the alternating current electricity output by the alternating current port may be determined in a linear interpolation manner based on two islanding disturbance coefficients that are one-to-one corresponding to the two harmonic amplitude growth rates.

In addition, in this embodiment of this application, the correspondence between a harmonic amplitude growth rate and an islanding disturbance coefficient listed in Table 1 above is used only as an example for description. Table 1 above does not constitute a limitation on this embodiment of this application.

It should be noted that, the correspondence between a harmonic amplitude growth rate range and an islanding disturbance coefficient may be preset, and in this correspondence, an average value of the harmonic amplitude growth rate range and the islanding disturbance coefficient are in the strictly monotonically increasing relationship, and a harmonic amplitude growth rate and the islanding disturbance coefficient are in the non-strictly monotonically increasing relationship. All harmonic amplitude growth rate ranges included in this correspondence do not overlap each other.

For example, if the harmonic amplitude growth rate of the alternating current electricity output by the alternating current port is 100%, based on the harmonic amplitude growth rate 100% of the alternating current electricity output by the alternating current port, it can be learned from a correspondence between a harmonic amplitude growth rate range and an islanding disturbance coefficient listed in the following Table 2 that, the corresponding islanding disturbance coefficient is 0.5.

TABLE 2

| Harmonic amplitude growth rate | Islanding disturbance coefficient |
|---|---|
| [100%, 150%) | 0.5 |
| [200%, 350%) | 1 |
| [400%, 650%) | 4 |
| ... | ... |

It should be noted that, when the harmonic amplitude growth rate of the alternating current electricity output by the alternating current port is between two adjacent harmonic amplitude growth rate ranges in Table 2 above, the island disturbance coefficient corresponding to the harmonic amplitude growth rate of the alternating current electricity output by the alternating current port may be determined in the linear interpolation manner based on two islanding disturbance coefficients that are one-to-one corresponding to the two harmonic amplitude growth rate ranges.

In addition, in this embodiment of this application, the correspondence between a harmonic amplitude growth rate range and an islanding disturbance coefficient listed in Table 2 above is used only as an example for description. Table 2 above does not constitute a limitation on this embodiment of this application.

It should be noted that, the reference function may be preset. For example, the reference function may be a strictly monotonically increasing function or a non-strictly monotonically increasing function. For example, the reference function may be y=kx+b, where both k and b may be preset, k may be a positive number, one of x and y may be the harmonic amplitude growth rate, and the other thereof may be the islanding disturbance coefficient.

Step 303: Determine an islanding injection amount based on the frequency growth rate of the alternating current electricity output by the alternating current port and the islanding disturbance coefficient corresponding to the harmonic amplitude growth rate of the alternating current electricity output by the alternating current port.

It should be noted that, the islanding injection amount is a reactive power size or a reactive current size for performing reactive power disturbance. The reactive power disturbance refers to disturbing the reactive power output by the alternating current port of the grid-tied inverter, so that the frequency of the alternating current electricity output by the alternating current port of the grid-tied inverter changes. The reactive power is an electric power required for establishing an alternating magnetic field and an induction flux. It is used for electric and magnetic fields in a circuit and used to establish and maintain a magnetic field in electric equipment. The reactive current is a current with a 90 degree phase difference from a voltage.

In addition, the frequency growth rate and the islanding disturbance coefficient each are in a positive correlation relationship with the islanding injection amount. That is, a smaller value of either of the frequency growth rate and the islanding disturbance coefficient indicates a smaller islanding injection amount and smaller subsequent reactive power disturbance; and a larger value of either of the frequency growth rate and the islanding disturbance coefficient indicates a larger islanding injection amount and larger subsequent reactive power disturbance.

In a possible implementation, the islanding injection amount is the reactive power size for performing reactive power disturbance, and the operation of step 303 may be as follows: an active power output by the alternating current port is determined; and the islanding disturbance coefficient corresponding to the harmonic amplitude growth rate of the alternating current electricity output by the alternating current port, the frequency growth rate of the alternating current electricity output by the alternating current port, and the active power output by the alternating current port are multiplied to obtain the islanding injection amount.

It should be noted that, the active power is an average value of instantaneous power output by a power supply in one cycle, and is an electric power required for maintaining normal operation of the electric equipment, namely, an electric power for converting electric energy into another form of energy (mechanical energy, photon energy, or thermal energy). During determining of the active power output by the alternating current port, the active power output by the alternating current port may be determined based on the voltage and the current of the alternating current electricity output by the alternating current port. In addition, for an operation for determining, based on the voltage and the current of the alternating current electricity output by the alternating current port, the active power output by the alternating current port, refer to a related technology. Details are not described in this embodiment of this application. For example, the active power output by the alternating current port may be determined in a manner such as the instantaneous reactive power theory based on the voltage and the current of the alternating current electricity output by the alternating current port.

Moreover, the islanding disturbance coefficient corresponding to the harmonic amplitude growth rate of the alternating current electricity output by the alternating current port, the frequency growth rate of the alternating current electricity output by the alternating current port, and the active power output by the alternating current port each are in a positive correlation relationship with the islanding injection amount. To be specific, a larger value of any one of the islanding disturbance coefficient, the frequency growth rate, and the active power indicates a larger islanding injection amount, and a smaller value of any one of the islanding disturbance coefficient, the frequency growth rate, and the active power indicates a smaller islanding injection amount.

In another possible implementation, the islanding injection amount is the reactive current size for performing reactive power disturbance, and the operation of step 303 may be as follows: an active current output by the alternating current port is determined; and the islanding disturbance coefficient corresponding to the harmonic amplitude growth rate of the alternating current electricity output by the alternating current port, the frequency growth rate of the alternating current electricity output by the alternating current port, and the active current output by the alternating current port are multiplied to obtain the islanding injection amount.

It should be noted that, the active current is a current that has a same phase as a voltage. During determining of the active current output by the alternating current port, the active current output by the alternating current port may be determined based on the current of the alternating current electricity output by the alternating current port. In addition, for an operation for determining, based on the current of the alternating current electricity output by the alternating current port, the active current output by the alternating current port, refer to a related technology. Details are not described in this embodiment of this application. For example, the active current output by the alternating current port may be determined in a manner such as DQ coordinate transformation based on the current of the alternating current electricity output by the alternating current port.

Moreover, the islanding disturbance coefficient corresponding to the harmonic amplitude growth rate of the alternating current electricity output by the alternating current port, the frequency growth rate of the alternating current electricity output by the alternating current port, and the active current output by the alternating current port each are in the positive correlation relationship with the islanding injection amount. To be specific, a larger value of any one of the islanding disturbance coefficient, the frequency growth rate, and the active current indicates a larger islanding injection amount, and a smaller value of any one of the islanding disturbance coefficient, the frequency growth rate, and the active current indicates a smaller islanding injection amount.

Step 304: Control the grid-tied inverter based on the islanding injection amount to output the reactive power or the reactive current over the alternating current port.

That is, when the islanding injection amount is the reactive power size for performing reactive power disturbance, the grid-tied inverter is controlled to output, over the alternating current port, a reactive power whose size is the reactive power size indicated by the islanding injection amount; or when the islanding injection amount is the reactive current size for performing reactive power disturbance, the grid-tied inverter is controlled to output, over the alternating current port, a reactive current whose size is the reactive current size indicated by the islanding injection amount.

It should be noted that, in this embodiment of this application, when the harmonic amplitude growth rate of the alternating current electricity output by the alternating current port is relatively low, it indicates that the possibility of islanding occurrence is relatively low. In this case, the determined islanding disturbance coefficient is relatively low, and the grid-tied inverter is controlled to output a relatively small reactive power or reactive current over the alternating current port. When the harmonic amplitude growth rate of the alternating current electricity output by the alternating current port is relatively high, it indicates that the possibility of islanding occurrence is relatively high. In this case, the determined islanding disturbance coefficient is relatively high, and the grid-tied inverter is controlled to output a relatively large reactive power or reactive current over the alternating current port.

It should be noted that, when the grid-tied inverter is controlled to output a reactive power or a reactive current over the alternating current port, closed-loop control can be performed by using a reactive power/reactive current control loop (for example, a PQ decoupled reactive power loop or a DQ decoupled reactive current loop). In this case, when the active power output by the alternating current port is obtained, the reactive power output by the alternating current port may be obtained at the same time. Then, when the grid-tied inverter is controlled to output, over the alternating current port, the reactive power whose size is the reactive power size indicated by the islanding injection amount, closed-loop control can be implemented based on the obtained reactive power. Alternatively, when the active current output by the alternating current port is obtained, the reactive current output by the alternating current port may be obtained at the same time. Then, when the grid-tied inverter is controlled to output, over the alternating current port, the reactive current whose size is the reactive current size indicated by the islanding injection amount, closed-loop control can be implemented based on the obtained reactive current.

Step 305: Perform islanding detection based on the frequency of the alternating current electricity output by the alternating current port.

When islanding does not occur, the harmonic in the alternating current electricity output by the alternating current port does not abruptly change, that is, the harmonic amplitude growth rate of the alternating current electricity output by the alternating current port is relatively low, in this case, the islanding disturbance coefficient is relatively low, and the grid-tied inverter is controlled to output a relatively small reactive power or reactive current over the alternating current port, to help reduce disturbance to a power grid and improve grid connection stability, thereby improving adaptability of the grid-tied inverter to a weak power grid. In addition, because islanding does not occur at this time, that is, the grid-tied inverter is connected to the power grid, the frequency of the alternating current electricity output by the alternating current port is not offset. Accordingly, it can be accurately detected that islanding does not occur.

After islanding occurs, the harmonic in the alternating current electricity output by the alternating current port changes abruptly, that is, the harmonic amplitude growth rate of the alternating current electricity output by the alternating current port increases. In this case, the islanding disturbance coefficient also increases, and the grid-tied inverter is controlled to output a relatively large reactive power or reactive current over the alternating current port. Because a size of the reactive power or the reactive current output by the alternating current port is also determined by the frequency growth rate of the alternating current electricity output by the alternating current port, under action of a frequency positive feedback feature unique to islanding, the frequency of the alternating current electricity output by the alternating current port can be quickly offset. Accordingly, it can be accurately detected that islanding occurs.

In addition, when islanding does not occur, even if the harmonic in the alternating current electricity output by the alternating current port changes abruptly due to a fluctuation of the power grid, the grid-tied inverter does not directly perform islanding protection. Instead, the grid-tied inverter is controlled to first output an increasing reactive power or reactive current over the alternating current port, and subsequently perform islanding detection based on the frequency of the alternating current electricity output by the alternating current port, to determine whether to perform islanding protection. When islanding does not occur, that is, when the grid-tied inverter is connected to the power grid, even if the reactive power or the reactive current output by the alternating current port is relatively large, the frequency of the alternating current electricity output by the alternating current port is not offset. Accordingly, it can be accurately detected that islanding does not occur. This can prevent the grid-tied inverter from falsely performing islanding protection due to the fluctuation of the power grid.

It can be learned from the foregoing description that, in this embodiment of this application, in one aspect, disturbance to the power grid caused by an islanding detection operation can be reduced when islanding does not occur, that is, when the grid-tied inverter works normally, to improve grid connection stability; and in another aspect, islanding occurrence can be quickly detected when islanding occurs, to reduce a detection time and improve reliability and security, thereby quickly implementing islanding protection.

Specifically, the operation of step 305 may be as follows: When the frequency of the alternating current electricity output by the alternating current port is continuously greater than a first reference frequency or continuously less than a second reference frequency within reference duration, it is determined that islanding occurs. Certainly, the islanding detection may alternatively be performed in another manner based on the frequency of the alternating current electricity output by the alternating current port. This embodiment of this application sets no limitation thereto.

It should be noted that, the reference duration, the first reference frequency, and the second reference frequency may all be preset. In addition, the first reference frequency may be set to a smaller value, and the second reference frequency may be set to a larger value. In this way, when the frequency of the alternating current electricity output by the alternating current port is continuously greater than the first reference frequency or continuously less than the second reference frequency within the reference duration, it indicates that the frequency of the alternating current electricity output by the alternating current port is continuously relatively small or large within a period of time. Therefore, it can be determined that islanding has occurred.

Further, after step 305, when it is determined that islanding has occurred, islanding protection may be performed. Specifically, outputting the alternating current electricity over the alternating current port of the grid-tied inverter may be stopped. Certainly, islanding protection may alternatively be performed in another manner. This embodiment of this application sets no limitation thereto.

Figure 4:
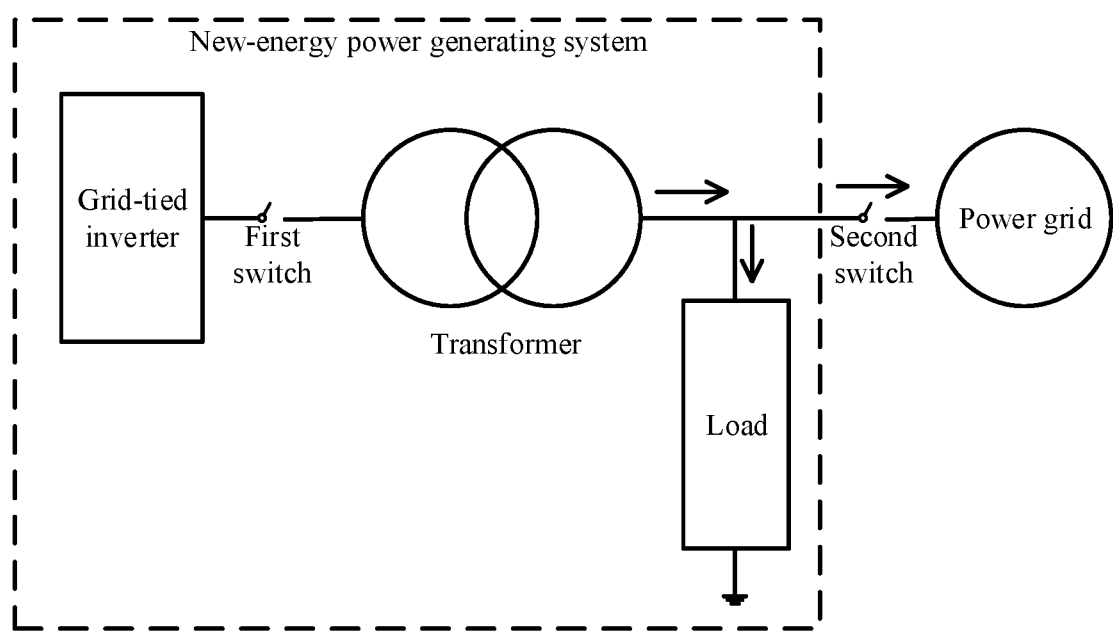
FIG. 4 is a schematic diagram of a new-energy power generating system according to an embodiment of this application.

For example, as shown in FIG. 4, the new-energy power generating system includes a grid-tied inverter, a transformer, and a load. An alternating current port of the grid-tied inverter is connected to the transformer by using a first switch, an output end of the transformer is connected to the power grid by using a second switch, and the output end of the transformer is connected to the load. When the power grid is cut off, the second switch is open, and a connection between the new-energy power generating system and the power grid is interrupted. In this case, the grid-tied inverter continues to supply power to the load, which causes islanding. When islanding occurrence is detected by using the islanding detection method provided in this embodiment of this application, the first switch may be open, to stop outputting the alternating current electricity over the alternating current port of the grid-tied inverter. In this way, the grid-tied inverter no longer supplies power to the load, thereby implementing islanding protection.

For ease of understanding, the islanding detection method is described below by using an example with reference to FIG. 5 and FIG. 6.

Figure 5:
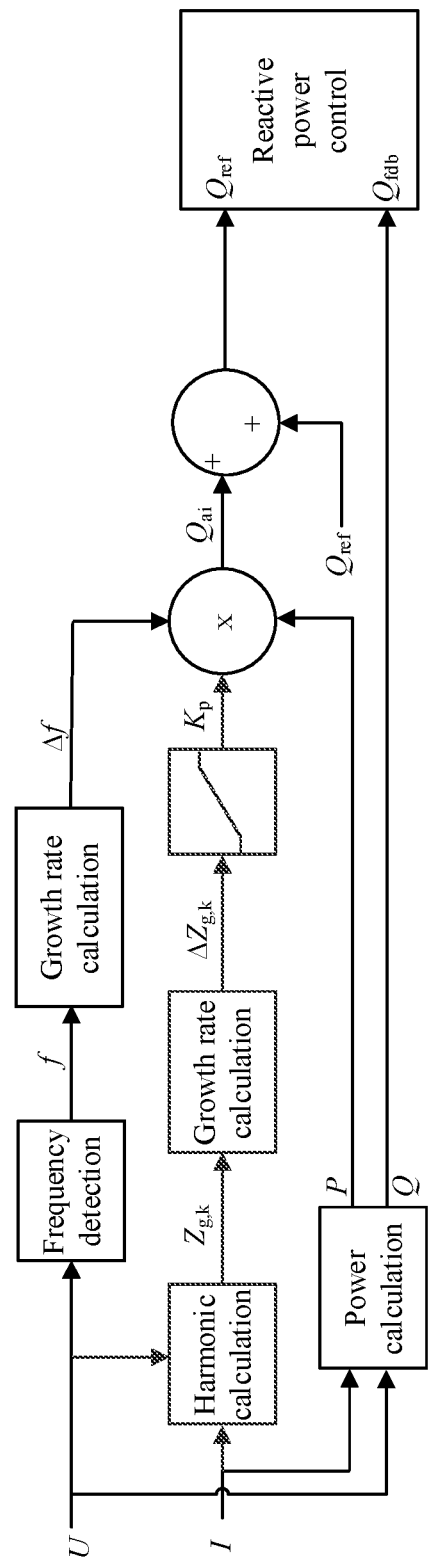
FIG. 5 is a schematic diagram of an islanding detection procedure according to an embodiment of this application.

In a possible implementation, as shown in FIG. 5, a frequency f of a voltage U of the alternating current electricity output by the alternating current port of the grid-tied inverter may be detected, and a frequency growth rate Δf of the alternating current electricity output by the alternating current port is determined based on the detected frequency f. In addition, the voltage U and a current I of the alternating current electricity output by the alternating current port may be detected in real time; a harmonic impedance amplitude $Z_{g,k}$ of the alternating current electricity output by the alternating current port is determined based on the detected voltage U and current I; accordingly, a harmonic impedance amplitude growth rate $\Delta Z_{g,k}$ of the alternating current electricity output by the alternating current port is determined; and then an islanding disturbance coefficient $K_p$ corresponding to the harmonic impedance amplitude growth rate $\Delta Z_{g,k}$ of the alternating current electricity output by the alternating current port is determined. In addition, an active power P and a reactive power Q output by the alternating current port may be determined based on the voltage U and the current I that are detected in real time. Then, the frequency growth rate Δf, the islanding disturbance coefficient $K_p$, and the active power P are multiplied to obtain a reactive power size $Q_{ai}$ for performing reactive power disturbance. Afterwards, based on the reactive power size $Q_{ai}$ for performing reactive power disturbance, a size $Q_{fdb}$ of the detected reactive power Q, and a size $Q_{ref}$ of a reactive power that needs to be output by the grid-tied inverter, the grid-tied inverter is controlled to output a reactive power whose size is $Q_{ai}$ over the alternating current port.

Figure 6:
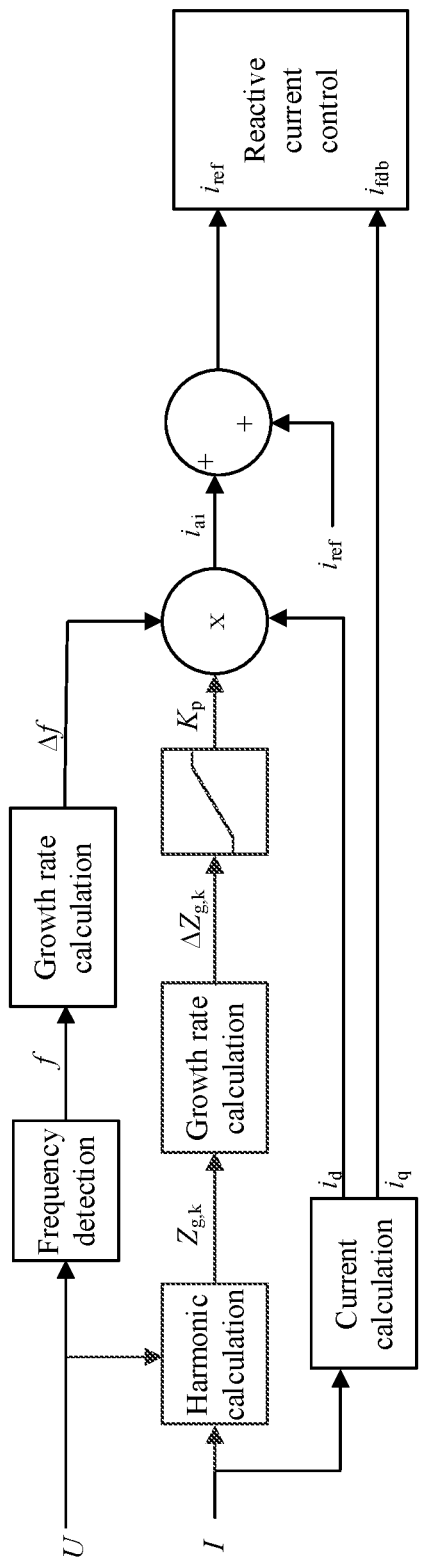
FIG. 6 is a schematic diagram of another islanding detection procedure according to an embodiment of this application.

In another possible implementation, as shown in FIG. 6, a frequency f of a voltage U of the alternating current electricity output by the alternating current port of the grid-tied inverter may be detected, and a frequency growth rate Δf of the alternating current electricity output by the alternating current port is determined based on the detected frequency f. In addition, the voltage U and a current I of the alternating current electricity output by the alternating current port may be detected in real time; a harmonic impedance amplitude $Z_{g,k}$ of the alternating current electricity output by the alternating current port is determined based on the detected voltage U and current I; accordingly, a harmonic impedance amplitude growth rate $\Delta Z_{g,k}$ of the alternating current electricity output by the alternating current port is determined; and then an islanding disturbance coefficient $K_p$ corresponding to the harmonic impedance amplitude growth rate $\Delta Z_{g,k}$ of the alternating current electricity output by the alternating current port is determined. In addition, an active current $i_d$ and a reactive current $i_q$ that are output by the alternating current port may be determined based on the current I detected in real time. Then, the frequency growth rate Δf, the islanding disturbance coefficient $K_p$, and the active current $i_d$ are multiplied to obtain a reactive current size $i_{ai}$ for performing reactive power disturbance. Afterwards, based on the reactive current size $i_{ai}$ for performing reactive power disturbance, a size $i_{fdb}$ of the detected reactive current $i_q$, and a size $i_{ref}$ of a reactive current that needs to be output by the grid-tied inverter, the grid-tied inverter is controlled to output a reactive current whose size is $i_{ai}$ over the alternating current port.

In this embodiment of this application, the harmonic amplitude growth rate and the frequency growth rate of the alternating current electricity output by the alternating current port of the grid-tied inverter are determined. Afterwards, the islanding disturbance coefficient corresponding to the harmonic amplitude growth rate of the alternating current electricity output by the alternating current port is determined, and the harmonic amplitude growth rate and the islanding disturbance coefficient are in the monotonically increasing relationship. The islanding injection amount is determined based on the frequency growth rate of the alternating current electricity output by the alternating current port and the islanding disturbance coefficient corresponding to the harmonic amplitude growth rate of the alternating current electricity output by the alternating current port. The grid-tied inverter is controlled based on the islanding injection amount to output the reactive power or the reactive current over the alternating current port. Finally, the islanding detection is performed based on the frequency of the alternating current electricity output by the alternating current port. In this way, whether islanding occurs can be accurately detected. In addition, when islanding does not occur, not only the disturbance to the power grid can be reduced to improve the grid connection stability, but also false detection caused by a fluctuation of the power grid can be avoided. When islanding occurs, it can be quickly detected, and a detection time is relatively short.

Figure 7:
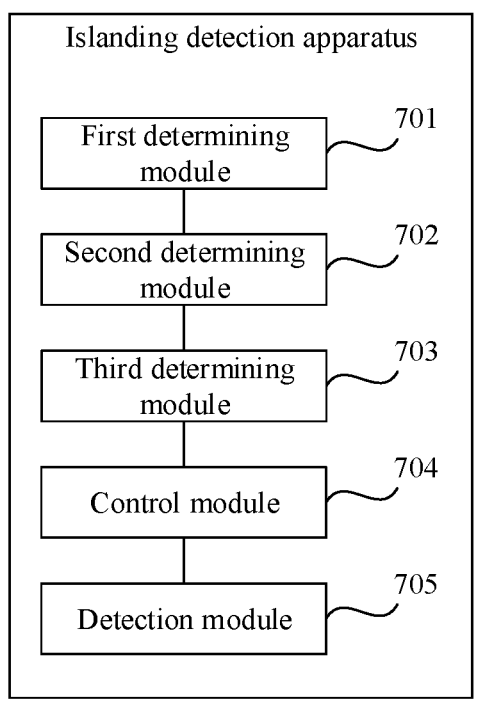
FIG. 7 is a schematic structural diagram of an islanding detection apparatus according to an embodiment of this application.

FIG. 7 is a schematic structural diagram of an islanding detection apparatus according to an embodiment of this application. The apparatus may be implemented as a part or a whole of a computer device by using software, hardware, or a combination thereof. The computer device may be the computer device shown in FIG. 2. Refer to FIG. 7. The apparatus includes a first determining module 701, a second determining module 702, a third determining module 703, a control module 704, and a detection module 705.

The first determining module 701 is configured to perform step 301 in the embodiment in FIG. 3.

The second determining module 702 is configured to perform step 302 in the embodiment in FIG. 3.

The third determining module 703 is configured to perform step 303 in the embodiment in FIG. 3.

The control module 704 is configured to perform step 304 in the embodiment in FIG. 3.

The detection module 705 is configured to perform step 305 in the embodiment in FIG. 3.

Optionally, the harmonic amplitude growth rate is a harmonic voltage amplitude growth rate, and the first determining module 701 includes:
a first determining unit, configured to determine, based on a voltage of the alternating current electricity output by the alternating current port, a harmonic voltage amplitude of the alternating current electricity output by the alternating current port; and
a second determining unit, configured to determine, based on the harmonic voltage amplitude, the harmonic voltage amplitude growth rate of the alternating current electricity output by the alternating current port.

Optionally, the harmonic amplitude growth rate is a harmonic impedance amplitude growth rate, and the first determining module 701 includes:
a first determining unit, configured to determine, based on a voltage of the alternating current electricity output by the alternating current port, a harmonic voltage amplitude of the alternating current electricity output by the alternating current port;
a third determining unit, configured to determine, based on a current of the alternating current electricity output by the alternating current port, a harmonic current amplitude of the alternating current electricity output by the alternating current port;
a first calculation unit, configured to divide the harmonic voltage amplitude by the harmonic current amplitude to obtain a harmonic impedance amplitude of the alternating current electricity output by the alternating current port; and
a fourth determining unit, configured to determine, based on the harmonic impedance amplitude, the harmonic impedance amplitude growth rate of the alternating current electricity output by the alternating current port.

Optionally, the second determining module 702 includes:
a first obtaining unit, configured to: when the harmonic amplitude growth rate and the islanding disturbance coefficient are in a strictly monotonically increasing relationship, obtain the corresponding islanding disturbance coefficient from a stored correspondence between a harmonic amplitude growth rate and an islanding disturbance coefficient based on the harmonic amplitude growth rate; or a second obtaining unit, configured to: when the harmonic amplitude growth rate and the islanding disturbance coefficient are in a non-strictly monotonically increasing relationship, obtain the corresponding islanding disturbance coefficient from a stored correspondence between a harmonic amplitude growth rate range and an islanding disturbance coefficient based on the harmonic amplitude growth rate; or a third obtaining unit, configured to obtain the corresponding islanding disturbance coefficient based on the harmonic amplitude growth rate by using a reference function.

Optionally, the islanding injection amount is a reactive power size for performing reactive power disturbance, and the third determining module 703 includes:

a fifth determining unit, configured to determine an active power output by the alternating current port; and a second calculation unit, configured to multiply the islanding disturbance coefficient corresponding to the harmonic amplitude growth rate, the frequency growth rate, and the active power output by the alternating current port, to obtain the islanding injection amount.

Optionally, the islanding injection amount is a reactive current size for performing reactive power disturbance, and the third determining module 703 includes:

a sixth determining unit, configured to determine an active current output by the alternating current port; and a third calculation unit, configured to multiply the islanding disturbance coefficient corresponding to the harmonic amplitude growth rate, the frequency growth rate, and the active current output by the alternating current port, to obtain the islanding injection amount.

Optionally, the detection module 705 is configured to:

when the frequency of the alternating current electricity output by the alternating current port is continuously greater than a first reference frequency or continuously less than a second reference frequency within reference duration, determine that islanding occurs.

Optionally, the apparatus is further configured to:

when it is determined that islanding occurs, stop outputting the alternating current electricity over the alternating current port.

In this embodiment of this application, the harmonic amplitude growth rate and the frequency growth rate of the alternating current electricity output by the alternating current port of the grid-tied inverter are determined. Afterwards, the islanding disturbance coefficient corresponding to the harmonic amplitude growth rate of the alternating current electricity output by the alternating current port is determined, and the harmonic amplitude growth rate and the islanding disturbance coefficient are in the monotonically increasing relationship. The islanding injection amount is determined based on the frequency growth rate of the alternating current electricity output by the alternating current port and the islanding disturbance coefficient corresponding to the harmonic amplitude growth rate of the alternating current electricity output by the alternating current port. The grid-tied inverter is controlled based on the islanding injection amount to output the reactive power or the reactive current over the alternating current port. Finally, the islanding detection is performed based on the frequency of the alternating current electricity output by the alternating current port. In this way, whether islanding occurs can be accurately detected. In addition, when islanding does not occur, not only the disturbance to the power grid can be reduced to improve the grid connection stability, but also false detection caused by a fluctuation of the power grid can be avoided. When islanding occurs, it can be quickly detected, and a detection time is relatively short.

It should be noted that, when detecting islanding, the islanding detection apparatus provided in the foregoing embodiments is described only using division of the foregoing functional modules. In practice, the functions may be allocated to different functional modules for implementation as required. To be specific, an internal structure of an apparatus is divided into different functional modules to implement all or part of the functions described above. In addition, the islanding detection apparatus provided in the foregoing embodiment belongs to a same concept as the islanding detection method embodiment. For a specific implementation process thereof, refer to the method embodiment. Details are not described herein again.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (Digital Versatile Disc, DVD)), a semiconductor medium (for example, a solid-state drive (Solid State Disk, SSD)), or the like.

The foregoing descriptions are merely the embodiments of this application, but are not intended to limit this application. Any modification, equivalent replacement, or improvement made without departing from the spirit and principle of this application should fall within the protection scope of this application.

What is claimed is:

1. An islanding detection method comprising:

determining a harmonic amplitude growth rate and a frequency growth rate of alternating current electricity output by an alternating current port of a grid-tied inverter;

determining an islanding disturbance coefficient corresponding to the harmonic amplitude growth rate, wherein the harmonic amplitude growth rate and the islanding disturbance coefficient are in a monotonically increasing relationship;

determining an islanding injection amount based on the frequency growth rate and the islanding disturbance coefficient corresponding to the harmonic amplitude growth rate, wherein the islanding injection amount is one of a reactive power size or a reactive current size for performing reactive power disturbance;

controlling, based on the islanding injection amount, the grid-tied inverter to output a reactive power or a reactive current over the alternating current port; and performing islanding detection based on a frequency of the alternating current electricity output by the alternating current port.

2. The method according to claim 1, wherein the harmonic amplitude growth rate is a harmonic voltage amplitude growth rate, and the determining a harmonic amplitude growth rate of alternating current electricity output by an alternating current port of a grid-tied inverter comprises:

determining, based on a voltage of the alternating current electricity output by the alternating current port, a harmonic voltage amplitude of the alternating current electricity output by the alternating current port; and determining, based on the harmonic voltage amplitude, the harmonic voltage amplitude growth rate of the alternating current electricity output by the alternating current port.

3. The method according to claim 1, wherein the harmonic amplitude growth rate is a harmonic impedance amplitude growth rate, and the determining a harmonic amplitude growth rate of alternating current electricity output by an alternating current port of a grid-tied inverter comprises:

determining, based on a voltage of the alternating current electricity output by the alternating current port, a harmonic voltage amplitude of the alternating current electricity output by the alternating current port;

determining, based on a current of the alternating current electricity output by the alternating current port, a harmonic current amplitude of the alternating current electricity output by the alternating current port;

dividing the harmonic voltage amplitude by the harmonic current amplitude to obtain a harmonic impedance amplitude of the alternating current electricity output by the alternating current port; and determining, based on the harmonic impedance amplitude, the harmonic impedance amplitude growth rate of the alternating current electricity output by the alternating current port.

4. The method of claim 1, wherein the determining an islanding disturbance coefficient corresponding to the harmonic amplitude growth rate comprises:

when the harmonic amplitude growth rate and the islanding disturbance coefficient are in a strictly monotonically increasing relationship, obtaining the corresponding islanding disturbance coefficient from a stored correspondence between a harmonic amplitude growth rate and an islanding disturbance coefficient based on the harmonic amplitude growth rate; or when the harmonic amplitude growth rate and the islanding disturbance coefficient are in a non-strictly monotonically increasing relationship, obtaining the corresponding islanding disturbance coefficient from a stored correspondence between a harmonic amplitude growth rate range and an islanding disturbance coefficient based on the harmonic amplitude growth rate; or obtaining the corresponding islanding disturbance coefficient based on the harmonic amplitude growth rate by using a reference function.

5. The method of claim 1, wherein the islanding injection amount is the reactive power size for performing reactive power disturbance, and the determining an islanding injection amount based on the frequency growth rate and the islanding disturbance coefficient corresponding to the harmonic amplitude growth rate comprises:

determining an active power output by the alternating current port; and multiplying the islanding disturbance coefficient corresponding to the harmonic amplitude growth rate, the frequency growth rate, and the active power output by the alternating current port, to obtain the islanding injection amount.

6. The method of claim 1, wherein the islanding injection amount is the reactive current size for performing reactive power disturbance, and the determining an islanding injection amount based on the frequency growth rate and the islanding disturbance coefficient corresponding to the harmonic amplitude growth rate comprises:

determining an active current output by the alternating current port; and multiplying the islanding disturbance coefficient corresponding to the harmonic amplitude growth rate, the frequency growth rate, and the active current output by the alternating current port, to obtain the islanding injection amount.

7. The method of claim 1, wherein the performing islanding detection based on a frequency of the alternating current electricity output by the alternating current port comprises:

when the frequency of the alternating current electricity output by the alternating current port is one of continuously greater than a first reference frequency or continuously less than a second reference frequency within reference duration, determining that islanding occurs.

8. The method of claim 1, wherein after the performing islanding detection based on a frequency of the alternating current port, the method further comprises:

when it is determined that islanding occurs, stopping outputting the alternating current electricity over the alternating current port.

9. An islanding detection apparatus, comprising:

a processor; and a non-transitory computer readable memory storing instructions that when executed by the processor, cause the processor to perform steps comprising:

determining a harmonic amplitude growth rate and a frequency growth rate of alternating current electricity output by an alternating current port of a grid-tied inverter;

determining an islanding disturbance coefficient corresponding to the harmonic amplitude growth rate, wherein the harmonic amplitude growth rate and the islanding disturbance coefficient are in a monotonically increasing relationship;

determining an islanding injection amount based on the frequency growth rate and the islanding disturbance coefficient corresponding to the harmonic amplitude growth rate, wherein the islanding injection amount is one of a reactive power size or a reactive current size for performing reactive power disturbance;

controlling, based on the islanding injection amount, the grid-tied inverter to output a reactive power or a reactive current over the alternating current port; and performing islanding detection based on a frequency of the alternating current electricity output by the alternating current port.

10. The apparatus according to claim 9, wherein the harmonic amplitude growth rate is a harmonic voltage amplitude growth rate, and the determining a harmonic amplitude growth rate of alternating current electricity output by an alternating current port of a grid-tied inverter comprises:

determining, based on a voltage of the alternating current electricity output by the alternating current port, a harmonic voltage amplitude of the alternating current electricity output by the alternating current port; and determining, based on the harmonic voltage amplitude, the harmonic voltage amplitude growth rate of the alternating current electricity output by the alternating current port.

11. The apparatus according to claim 9, wherein the harmonic amplitude growth rate is a harmonic impedance amplitude growth rate, and the determining a harmonic amplitude growth rate of alternating current electricity output by an alternating current port of a grid-tied inverter comprises:

determining, based on a voltage of the alternating current electricity output by the alternating current port, a harmonic voltage amplitude of the alternating current electricity output by the alternating current port;

determining, based on a current of the alternating current electricity output by the alternating current port, a harmonic current amplitude of the alternating current electricity output by the alternating current port;

dividing the harmonic voltage amplitude by the harmonic current amplitude to obtain a harmonic impedance amplitude of the alternating current electricity output by the alternating current port; and determining, based on the harmonic impedance amplitude, the harmonic impedance amplitude growth rate of the alternating current electricity output by the alternating current port.

12. The apparatus according to claim 9, wherein the determining an islanding disturbance coefficient corresponding to the harmonic amplitude growth rate comprises:

when the harmonic amplitude growth rate and the islanding disturbance coefficient are in a strictly monotonically increasing relationship, obtaining the corresponding islanding disturbance coefficient from a stored correspondence between a harmonic amplitude growth rate and an islanding disturbance coefficient based on the harmonic amplitude growth rate; or when the harmonic amplitude growth rate and the islanding disturbance coefficient are in a non-strictly monotonically increasing relationship, obtaining the corresponding islanding disturbance coefficient from a stored correspondence between a harmonic amplitude growth rate range and an islanding disturbance coefficient based on the harmonic amplitude growth rate; or obtaining the corresponding islanding disturbance coefficient based on the harmonic amplitude growth rate by using a reference function.

13. The apparatus according to claim 9, wherein the islanding injection amount is the reactive power size for performing reactive power disturbance, and the determining an islanding injection amount based on the frequency growth rate and the islanding disturbance coefficient corresponding to the harmonic amplitude growth rate comprises:

determining an active power output by the alternating current port; and multiplying the islanding disturbance coefficient corresponding to the harmonic amplitude growth rate, the frequency growth rate, and the active power output by the alternating current port, to obtain the islanding injection amount.

14. The apparatus according to claim 9, wherein the islanding injection amount is the reactive current size for performing reactive power disturbance, and the determining an islanding injection amount based on the frequency growth rate and the islanding disturbance coefficient corresponding to the harmonic amplitude growth rate comprises:

determining an active current output by the alternating current port; and multiplying the islanding disturbance coefficient corresponding to the harmonic amplitude growth rate, the frequency growth rate, and the active current output by the alternating current port, to obtain the islanding injection amount.

15. The apparatus according to claim 9, wherein the performing islanding detection based on a frequency of the alternating current electricity output by the alternating current port comprises:

when the frequency of the alternating current electricity output by the alternating current port is one of continuously greater than a first reference frequency or continuously less than a second reference frequency within reference duration, determining that islanding occurs.

16. The apparatus according to claim 9, wherein after the performing islanding detection based on a frequency of the alternating current port, the steps further comprise:

when it is determined that islanding occurs, stopping outputting the alternating current electricity over the alternating current port.

17. A non-transitory computer-readable storage medium, wherein the computer-readable storage medium stores instructions comprising:

determining a harmonic amplitude growth rate and a frequency growth rate of alternating current electricity output by an alternating current port of a grid-tied inverter;

determining an islanding disturbance coefficient corresponding to the harmonic amplitude growth rate, wherein the harmonic amplitude growth rate and the islanding disturbance coefficient are in a monotonically increasing relationship;

determining an islanding injection amount based on the frequency growth rate and the islanding disturbance coefficient corresponding to the harmonic amplitude growth rate, wherein the islanding injection amount is one of a reactive power size or a reactive current size for performing reactive power disturbance;

controlling, based on the islanding injection amount, the grid-tied inverter to output a reactive power or a reactive current over the alternating current port; and performing islanding detection based on a frequency of the alternating current electricity output by the alternating current port.

* * * * *